US011704605B2

(12) United States Patent
Markov et al.

(10) Patent No.: US 11,704,605 B2
(45) Date of Patent: Jul. 18, 2023

(54) FRAMEWORK FOR GUIDED CHANGE MANAGEMENT AND CHANGE IMPACT ANALYSIS WITH AUTOMATED CHANGE VALIDATION THROUGH FORMAL EXECUTABLE SEMANTICS

(71) Applicants: Siemens Corporation, Iselin, NJ (US); The Open University, Milton Keynes (GB)

(72) Inventors: Georgi Markov, Plainsboro, NJ (US); Jon Hall, Milton Keynes (GB); Lucia Rapanotti, Milton Keynes (GB)

(73) Assignees: SIEMENS CORPORATION, Iselin, NJ (US); THE OPEN UNIVERSITY, Milton Keynes (GB)

( * ) Notice: Subject to any disclaimer, the term of this patent is extended or adjusted under 35 U.S.C. 154(b) by 142 days.

(21) Appl. No.: 16/837,165

(22) Filed: Apr. 1, 2020

(65) Prior Publication Data
US 2020/0320447 A1    Oct. 8, 2020

Related U.S. Application Data

(60) Provisional application No. 62/829,694, filed on Apr. 5, 2019.

(51) Int. Cl.
*G06Q 10/06* (2023.01)
*G06F 8/10* (2018.01)
*G06F 8/71* (2018.01)

(52) U.S. Cl.
CPC .............. *G06Q 10/06* (2013.01); *G06F 8/10* (2013.01); *G06F 8/71* (2013.01)

(58) Field of Classification Search
CPC .............. G06Q 10/06; G06F 8/10; G06F 8/71
See application file for complete search history.

(56) References Cited

U.S. PATENT DOCUMENTS

| 7,406,216 B2 * | 7/2008 | Baer | H04N 7/181 |
| | | | 348/E7.086 |
| 7,464,147 B1 * | 12/2008 | Fakhouri | G06Q 10/04 |
| | | | 709/223 |

(Continued)

OTHER PUBLICATIONS

Hall, Jon G.; Rapanotti, Lucia; Markov, Georgi (2017). A phenomenal basis for hybrid modeling, Proceedings of 5th IEEE International Workshop on Formal Methods Integration. (IEEE fMi 2017) Aug. 4-6, 2017.

(Continued)

*Primary Examiner* — Ninos Donabed

(57) ABSTRACT

A method of managing change in a complex system begins with identifying an unsatisfied need to be met by the system. To satisfy the need a proposed change to the system to satisfy the need is represented a high-level representation of the proposed change. The high-level representation is mapped to a low-level executable semantic model, which is used to validate the proposed change and ensure the proposed change meets the identified and does not require additional changes to the system. On a condition that the validating steps determines that additional changes are required the additional changes are represented in the high-level representation of the system; the high-level change is mapped to the low-level executable semantic model and the additional changes are re-validated.

10 Claims, 9 Drawing Sheets

(56) References Cited

U.S. PATENT DOCUMENTS

| | | | | |
|---|---|---|---|---|
| 10,963,411 B1* | 3/2021 | Voogel | ............... | G06F 13/4022 |
| 11,070,982 B1* | 7/2021 | Shaw | .................... | H04W 76/19 |
| 2006/0251292 A1* | 11/2006 | Gokturk | .................. | G06F 16/58 |
| | | | | 707/E17.022 |
| 2006/0251338 A1* | 11/2006 | Gokturk | .................. | G06F 18/22 |
| | | | | 707/E17.022 |
| 2006/0251339 A1* | 11/2006 | Gokturk | .................. | G06F 16/50 |
| | | | | 707/E17.022 |
| 2008/0148254 A1* | 6/2008 | Hofer | .................... | G06F 9/5077 |
| | | | | 717/174 |
| 2009/0284637 A1* | 11/2009 | Parulski | ............. | H04N 1/00183 |
| | | | | 348/E5.022 |
| 2010/0011347 A1* | 1/2010 | Isom | ....................... | G06F 9/455 |
| | | | | 717/168 |
| 2012/0259613 A1* | 10/2012 | Lafaye | ............... | G06F 11/3447 |
| | | | | 703/21 |
| 2016/0246582 A1* | 8/2016 | Benton | .................... | G06F 8/61 |
| 2016/0335511 A1* | 11/2016 | MacDonald | ........... | G06V 40/45 |
| 2020/0096958 A1* | 3/2020 | Kelly | ........................ | H02J 3/00 |
| 2021/0012881 A1* | 1/2021 | Queenan | ................ | G16H 50/70 |
| 2021/0136603 A1* | 5/2021 | Kottkamp | ............ | H04B 17/102 |
| 2021/0158151 A1* | 5/2021 | Wang | ................... | H04L 12/189 |

OTHER PUBLICATIONS

Markov, Georgi; Hall, Jon G.; Rapanotti, Lucia, POE-<delta>: Towards an engineering framework for solving change problems, Systems Research and Behavioral Science Syst. Res 36, 53-65 (2019). Published Aug. 8, 2018 in Wiley Online Library DOI 10.1002/sres.2533.

* cited by examiner

```
SWProgram1.0::    Ch_{d2a}!off;              % Initial State is off
                  μX.(Stop ≥                 % wait for boil request
                     (boilRequest?x;
                      Ch_{d2a}!on;           % turn heater element on
                         Wait60;             % for 60 seconds
                         Ch_{d2a}!off        % then turn it off;
                         X                   % and repeat
                     )
                  )
```

HCSP-inspired pseudo-code for kettle control logic

FRAMEWORK FOR GUIDED CHANGE MANAGEMENT AND CHANGE IMPACT ANALYSIS WITH AUTOMATED CHANGE VALIDATION THROUGH FORMAL EXECUTABLE SEMANTICS

CROSS-REFERENCE TO RELATED APPLICATIONS

This application claims the benefit of priority under 35 U.S.C. 119(e) to U.S. Provisional Patent Application Ser. No. 62/829,694 filed on Apr. 5, 2019, entitled FRAMEWORK FOR GUIDED CHANGE MANAGEMENT AND CHANGE IMPACT ANALYSIS WITH AUTOMATED CHANGE VALIDATION THROUGH FORMAL, EXECUTABLE SEMANTICS, which is incorporated by reference herein in its entirety.

TECHNICAL FIELD

This application relates to managing changes to a system.

BACKGROUND

The increasing adoption and convergence of new and highly disruptive technologies, for example blockchain and artificial intelligence, involve far-reaching, often transformational changes at many levels of the adopting organizations. Accordingly, successful change management is key for successful adoption of new advancements and technologies. Many changes, although technology driven, typically impact not only technical aspects of the organization, but likely spread to the rest of the organization including culture, business models, business processes, workforce, among other factors.

In addition, within the customer space technologies, particularly those involving software, will have extreme and expensive techniques applied to them, including full characterization of external behavior through mathematical modelling and the establishing of properties through various forms of mathematical proof. This must be performed for the establishment of non-functional properties including but not limited to security & safety. Such properties are extremely delicate, as the change of letter in a piece of code can invalidate the software completely and there is not a cost-effective means to reestablish the lost functionality. These considerations often form the value basis of a product or service allowing customer to satisfy a regulation for service, which generates their revenue stream. As such, change is often avoided, and the benefits of technological progress are lost for the product. New approaches are needed.

SUMMARY

A method for change management in a system includes identifying an unsatisfied need to be met by the system or an unsatisfied need generated by a change in context in the system. A proposed change to satisfy the need is represented in a high-level representation of the proposed change. The high-level representation is then mapped to a low-level executable semantic model. The low-level semantics are used to validate the proposed change to ensure the proposed change meets the identified need and does not require additional changes to the system. If validation determines that additional changes are required, the additional changes are represented in the high-level representation of the system. If additional changes are needed, the additional changes are then mapped to the low-level executable semantic model and the additional changes are re-validated. According to one embodiment, the additional changes related to a security aspect of the system. In another embodiment, the additional changes relate to a safety aspect of the system.

According to certain embodiments, the high-level representation is according to problem-oriented engineering—delta (POE-Δ) notation and the low-level executable semantic model is consistent with a hybrid communicating sequential processes (HCSP) language. The validation of the low-level executable semantic model may be performed by a simulation of the proposed change.

The mapping of the high-level representation to the low-level semantics may include identifying at least one phenomenon associated with an underlying mechanism of sub-system of the overall system, identifying relationships between phenomena, configuring a plurality of phenomena to achieve the identified need of the system and implement changes to the underlying mechanism to achieve the configuration of the plurality of phenomena. In some embodiments additional changes are cascaded through the system in response to another proposed change to the system. For example, a change to a logic program in the system may require the addition of a hardware sensor that provides an input to the logic program.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures:

FIG. 3 is an example code of a low-level language for implementing a change in a system according to aspects of embodiments of this disclosure.

DETAILED DESCRIPTION

Figure 1:
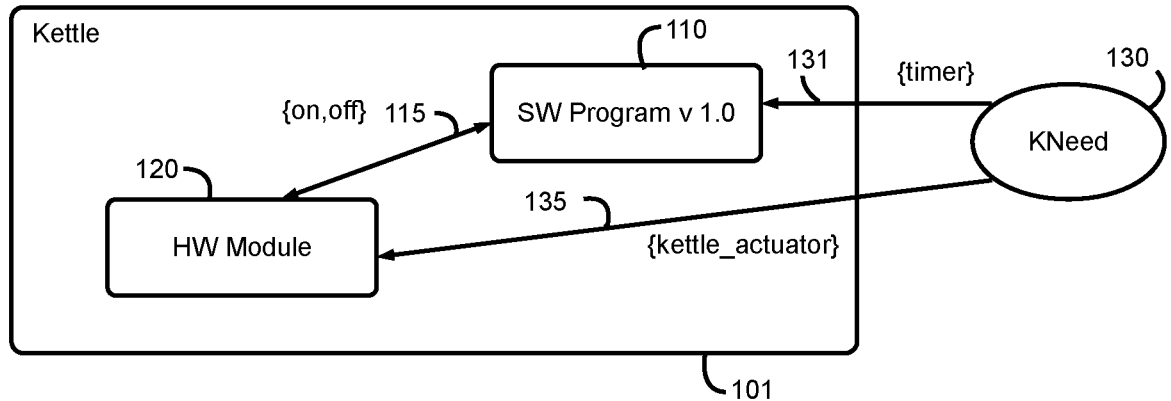
FIG. 1 is a high-level representation of a system to be managed according to aspects of embodiments of this disclosure.

Increasing adoption and convergence of new and highly disruptive technologies such as blockchain and artificial intelligence, introduce far-reaching, often transformational changes at multiple levels for the adopting organization. Successful change management is key for successful adoption of new technologies. Many changes while technology driven, typically impact not only technical aspects of the organization, but likely spread to the rest of the organization—including aspects such as culture, business models, business processes, workforce, etc.

In addition, technologies within the customer space in particular those accompanied by software, involve extreme and expensive techniques. For this reason, full characterization of external behavior through mathematical modelling and establishing of properties through various forms of mathematical proof, for the establishment of non-functional properties. Non-functional properties may include but are not limited to considerations such as security and safety. These properties are delicate in the extreme. For instance, the change of letter in a piece of code can invalidate the property completely leaving the user without a cost-effective path to reestablishment of the desired property. Properties like these inform the value basis of a product or service by allowing a customer to, for example, satisfy a regulation for a service which generates their revenue stream. Due to these challenges change is often inhibited, and the benefits of technological progress are lost for the product.

Therefore, the successful adoption of such technologies depends on: A) the ability to perform deep analysis of all potential changes across various aspects of the system or entire organization, including impacts and risks in consideration of the operating environment and the change's relation with other interfacing elements, B) the ability to reason, evaluate, and compare different potential scenarios and associated outcomes and C) to reason from each level between other levels of the system organization.

Despite a strong demand for systematic approaches to dealing with architectural changes, according to a detailed literature study of more than 2750 papers on the broader topic of architecture change and impact analysis, the majority of the literature on the topic focuses on narrow scopes and only consider immediate impacts the change has on the systems' architecture. A few approaches such as the Prism model of changes, consider the impact an architectural change on the rest of the environment, including the people, policies, laws, processes and resources. These approaches however do not provide a systematic way of arriving at a change problem solution. A desired solution should address complex and tangled problems requiring co-design and co-evolution of multiple dependent change domains Presently there is no way to utilize low-level executable semantics in order to validate change decisions or reason about various trade-offs.

The proposed approach is an extension and specialization to change management of the Problem Oriented Engineering (POE) framework for problem solving. POE is a design framework for problem solving. It sees problem solving as a socially situated design process, within which creativity and expertise come together to solve real-world problems by satisfying a wide range of stakeholder's needs. It captures such processes within a logical framework like proof-theoretic frameworks and provide a logical foundation to represent and reason about phenomenological relationships including new relationships unfolding in the process.

Embodiments described herein build on a deep semantic integration between POE-Δ, a design theoretic extension to POE for representing, structuring and exploring change problems, that is change to pre-existing systems. It represents the reason or need for change (e.g. requirements), the systems under change as well the system's operating environment and low-level approaches such as hybrid modelling, for example hybrid communicating sequential processes (HCSP) to enable formal, systematic reasoning about change problems including their impact on the remainder of the system while considering the operating environment. The environment may include the organization as a whole, workforce, business processes and models. Change analysis occurs at a high level. Embodiments of this disclosure link the high-level analysis with low-level techniques remaining fully compatible with the precise and executable semantics of low-level formal systems, such as HCSP. This deep semantic integration is achieved through mapping of the high-level concepts to the low-level executable semantics. It will be understood that low-level executable semantics may be implemented in software code but the term is not so limited. The term may also be applied to other fields including business processes (e.g., Business Process Model and Notation (BPMN), Aris process modeling, and like). This mapping provides deep semantic integration and can be achieved in some embodiments using Mechanism Description Language (MDL). Various notations belonging to the techniques may be integrated through this mapping to phenomenal models that represent various aspects of the system including set(s) of states, phenomena and communication channels allowing seamless transition between the two systems and their respective abstraction levels.

Embodiments of the present invention will be described by way of an illustrative example involving a design problem involving a kettle system. A kettle system includes hardware and software components which allow a vessel to contain a liquid and apply heat to the liquid to produce a heated liquid. Software may include functionality to control the application of heat to a contained liquid, while hardware may include the vessel, an element to provide the heating, and various communication channels or connections to resources outside of the kettle system. In the illustrated problem a new need is identified which will require a change to the existing design. The new need involves the desire to enable the kettle system to include communication and data processing that connects the kettle system to an outside distributed network. This capability is referred to the Internet of Things (IoT), where various components of a system include their own processing and data collection and storage along with connection channels to networks, such as cloud networks which interconnect the components and can even connect the overall system to other systems also in communication with the network.

FIG. 1 is a high-level representation of an original kettle system 101 before a change is implemented. In the example of FIG. 1, notation is based on POE-Δ. In the original design, the kettle 101 includes the ability to turn on 115, which applies heat to the contents of the kettle vessel, and the capability to apply the heat for a pre-determined length of time (e.g., one minute). The kettle system 101 includes a hardware module 120 that includes the kettle vessel, heating element and any other hardware that enables the physical functionality of the kettle 101. The kettle system 101 also include a software program 110 that performs logical operations to control functions including timer 131, switching function 115 and may include other functions. When the pre-determined time elapses based on timer 131, the kettle is turned off and the heat is no longer applied. The original kettle system 101 design is based on a need 130 that defines a need of the user. In this simple example, need 130 includes the desire to actuate the kettle 135 and to heat the kettle for a selected time via timer 131.

The kettle 101 is a simple example of a safety critical system: a buyer of the kettle 101 would expose themselves to danger should the kettle 101 fail to operate within its safety envelope. Such properties could be established through mathematical modelling of the kettle through, for instance, Simulink, or could be formally proven through direct mathematical modelling and proof in a language like HCSP, or through statistical means such as Monte-Carlo simulations.

An example of a system change will now be illustrated and applied to the original kettle design 101 depicted in FIG. 1. As technology advances, a user of kettle 101 may feel a need to operate the kettle remotely, such as via a computer or a mobile computing device, such as a phone or tablet. The remote device will need to communicate with the kettle system and may be connected to the kettle via a wireless network according to communication standards including IEEE standard 802.11 (WiFi) or BLUETOOTH from the Bluetooth special interest group.

Figure 2:
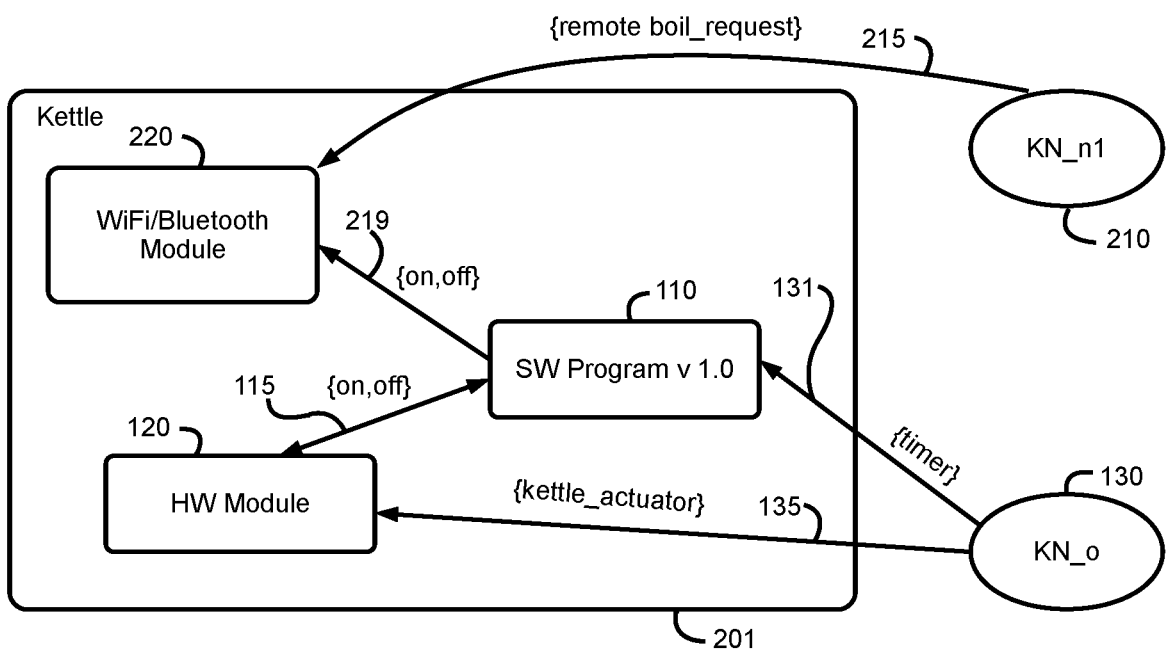
FIG. 2 is a high-level representation of a change to the system to fulfill a need according to aspects of embodiments of this disclosure.

FIG. 2 is a block diagram of a new design for kettle system 201. The new generation kettle 201 describes an Internet of Things (IoT) devices where the kettle includes some intelligent features that are enabled through network communications between the kettle 201 and a connected network. New kettle system 201 includes the original need 130 for actuating 135 and providing a time 131 for operation of the kettle hardware 120. Software program 110 is updated to provide control of kettle hardware 120 including commands for turning the heater element of the kettle on and/or off 115.

The additional need 210 KN_n1 includes connectivity for supplying a remote boil request 215 that is transmitted to a communications module 220. Software program 110 controls operation of the communication module 220 by control signal 219 of turning the communications module 220 on or off. FIG. 2 provides a high-level implementation of the newly designed kettle 201. The new kettle 201 includes remote control via a communication module 220 that is in communication with software program 110 for controlling the hardware components 120 of the kettle 201. Remote control may be enabled through an interactive interface with a user, such as an app running on a mobile computing device such as a smart phone or tablet.

Before changes are implemented, a validation of the proposed design may be performed. For the purpose of validation, the high-level change shown in FIG. 2 can be automatically translated to a low-level language with executable semantics. The result of this is shown in the pseudo-code using HCSP constructs which is listed in the code listing 300 of FIG. 3.

Figure 4:
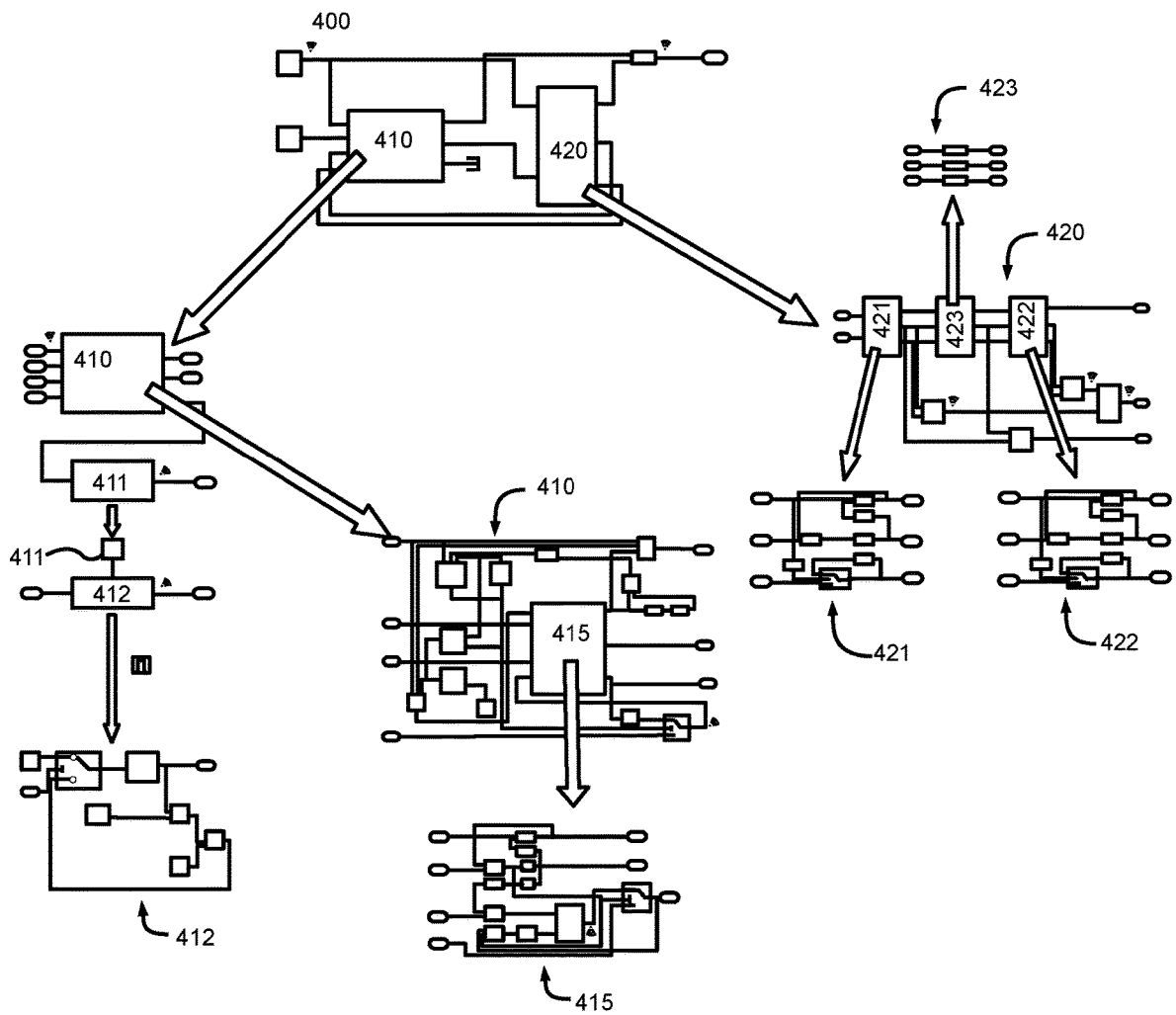
FIG. 4 is a low-level diagram of system for generating a simulation for validation of a design alternative according to aspects of embodiments of this disclosure.

The HCSP-inspired pseudo code of FIG. 3 may be used to generate a simulation in a simulation application such as the SIMULINK implementation shown in FIG. 4.

FIG. 4 shows a low-level implementation including an executable semantic model according to aspects of embodiments of the present invention. The representation of the integrated kettle system 400 is shown in varying levels of detail. The integrated kettle system includes the kettle system 410 and the kettle software program 420. The kettle system 410 includes the hardware components of the kettle including wireless communication module 411 which may receive a remote request to boil liquid in the kettle. Upon receipt of the boil request, the heating element 412 is activated. Other components may be associated with the heating element 412 including logic for determining an ambient temperature and calculating a heating rate when the heating element is 412 on and a cooling rate based in part on the ambient temperature when the heating element 412 is off. The kettle system includes logic for performing a repetition 415 of the heating/cooling cycle for a pre-determined amount of time. For heating, the heating element 412 is turned on, and the pre-determined time is measured to determine when to turn the heating element 412 off. When the heating element is turned off, the pre-determined time is measured again, and the heating element is cycled back on and the cycle repeats itself.

Kettle program 420 provides the software for controlling the kettle system 410. The program 420 includes the pre-determined timer 423 for providing the time for the heating element 412 of the kettle system 410 to cycle on and off. The software program 420 may provide control signals to the kettle system 410 for turning the wireless communication module 411 on or off or provide signals to turn the heating element 412 on or off. Software program 420 receives inputs from the outputs of kettle system 410 and provides outputs that serve as inputs to the kettle system 410. In this manner, the software program 420 can receive information from the kettle system 410, to process the received information and provide instructions or control signals to control operation of the kettle system 410 components.

Based on the low-level implementation of FIG. 4, simulations may be run to validate the design. In the example of FIG. 4, a wireless communication module is added and during simulation a flaw in the new system change affecting safety and security is discovered. Because the wireless communication model exposes the kettle system to a distributed network, an opportunity arises for a hacker to gain control of the kettle and to impair the proper operation of the kettle. By way of one non-limiting example, a hacker could gain control of the kettle system and decrease the amount of time the kettle remains off during heating/cooling cycles. If the kettle does not have sufficient time for cooling before the next heating phase begins, the overall maximum temperature will continue to rise if the time the element is on remains unchanged. Left unchecked, this could result in an overheated condition which could damage the kettle, or the environment in which the kettle operates (e.g. the plant).

Figure 5:
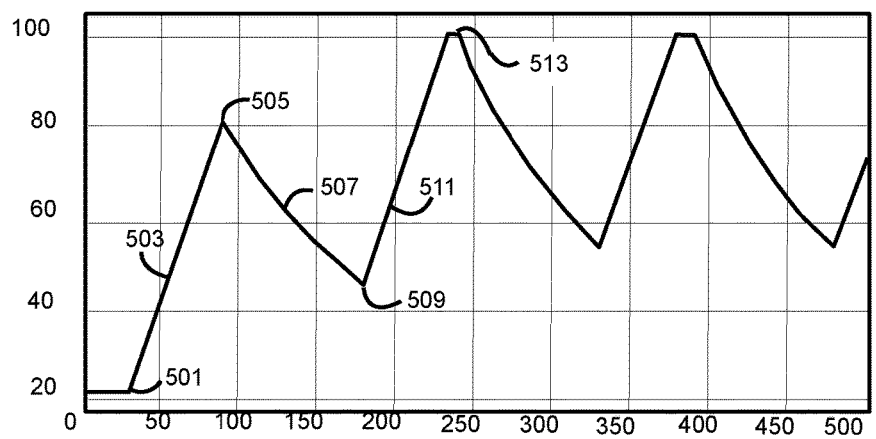
FIG. 5 is a graphical representation of a validation result according to aspects of embodiments of this disclosure.

FIG. 5 is a graphical depiction showing a possible outcome of a safety or security flaw in the change design shown in FIG. 4. As seen in FIG. 5, the current kettle system allows the kettle system to be compromised by a malevolent actor who gains access to the kettle's control via the added wireless communications module. Upon a request to boil water in the kettle, the element is turned on at point 501. With the element on, the temperature of the water increases 503. At the end of the pre-determined time defined by the timer, the element is cycled off at point 505. Should a hacker gain control and shorten the time the kettle can cool down, with the element off, the temperature begins to decrease 507 to point 509. At point 509, the element is turned back on and the heating cycle begins again. Due to a shortened cool down period, the temperature in the kettle does not decrease to its previous low temperature level 501. The kettle instead only cools to point 509 following the first heating cycle. Accordingly, the heating cycle 511 begins at a higher starting temperature and as a result the second heating cycle causes the temperature to increase to a level 513 that exceeds 90° C. Each successive heating cycle continues to exceed the 90° C. target. From this simulation result, a flaw is identified in that the kettle system does not prevent a dangerous overheating condition from occurring which could damage the kettle, or the building housing the kettle.

The discovery of this security and safety issue introduces additional requirements to the new version of the Kettle system, which may be summarized as:
1) Original Need (KN_o): continuous operation (temperature (t), constant on/off (e))
2) New Need (KN_n1): WiFi/Bluetooth connectivity for remote management, which due to safety/security concerns establishes additional requirements:
   a) Addition Need (KN_n2) Guarantee Safety: Temperature is not to exceed 90° Celsius to prevent overheating.
   b) Additional Need (KN_n3) Self-learning artificial intelligence (AI): AI-based security component to determine unusual behavior in components and implement countermeasures when anomalies are detected.

When the additional requirements needed to address the issues discovered during simulation are identified, the additional changes can be documented in an updated POE-Δ change representation, and the updated change problem can be evaluated.

Figure 6:
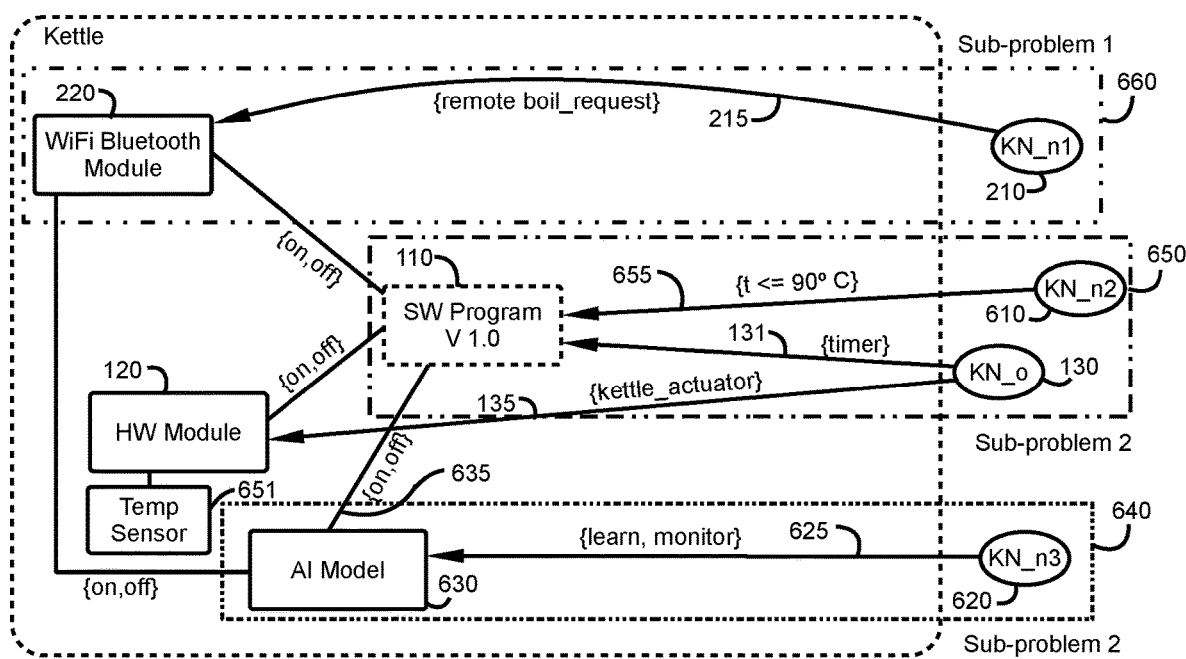
FIG. 6 is a high level of additional changes to a system according to results of a validation of a change according to aspects of embodiments of this disclosure.

FIG. 6 is a high-level representation of an updated change problem according to aspects of embodiments of the present invention. The needs driving the system changes are identified. The original need 130 permits the actuation 135 of the kettle using a timer 131. New need K_n1 210 is the establishment of communications module 220 to allow for a remote boil request 215. The introduction of wireless communications module 220 exposes security and safety flaws in the change design which creates new additional need KN_n2 650 which ensures safety by preventing an overheated condition in the kettle system. KN_n2 650 adds logic to software program 110 for receiving inputs from temperature sensor 651 to determine the temperature inside the kettle. The added logic compares the received temperature measurement against a pre-determined threshold temperature, by way of non-limiting example, a threshold temperature of 90° C. may be established corresponding to the boiling point of water. The additional logic performs a check to ensure the temperature in the kettle remains below 90° C. 655 to prevent overheating in the kettle. Additional need KN_n3 620 provides security measures to the change design by establishing an AI model 630 that is communication with the wireless communications module 220 and the software program 110. The AI model 630 learns the states of components in the system and the relationships between the states. The AI model 630 learns what normal operations look like with respect to the various system states and can identify when the observed states indicate that an abnormal operation has occurred. For example, if an abnormal operation is detected, AI model 630 adds logic 635 to program 110 which provides the ability to turn off the kettle actuator upon detection of an abnormal condition, such as a malicious attack, which prevents damage to the system.

The identified needs depicted in FIG. 6 may be characterized as 3 sub-problems. Sub-problem 1 660 establishes remote control of the kettle system. Sub-problem 2 650 provides safety by limiting a maximum temperature in the kettle. Sub-problem 3 640 provides security through the monitoring and learning of normal operations and providing control of the system in response to detected anomalies.

The process of implementing change to address the needs of the user will now be discussed in detail with focus on Sub-Problem2 650. In this example, it is assumed that sub-problems 640, 650, 660 are easily separable. The benefits achieved by embodiments of this disclosure are not limited to scenarios where sub-problems are easily separable. In some cases, sub-problems of the change design may be tangled and have interdependencies that conflict with the straight-forward operation of the various subsystems comprising the overall system. Embodiments of the change-management techniques described in this disclosure are fully capable of handling these complex problems. The use of an easily separable example should not serve to limit the scope of this disclosure and the techniques can be equally applied to more complex examples.

The System Architect identifies that the current output $ch_{d2a}!on$; timer command $Wait_{60}$; and output $ch_{d2a}!off$ control logic shown in the logic listing of FIG. 3 are where changes need to be made. The current logic does not include any safety implementation meaning that the kettle always remains on for a fix amount of time (60 sec). The kettle does not acknowledge any feedback from a temperature sensor regarding the current temperature of the heating module. This creates a weakness in that a defective or hacked unit would lack overheating control and may result in a safety hazard.

Figure 7:
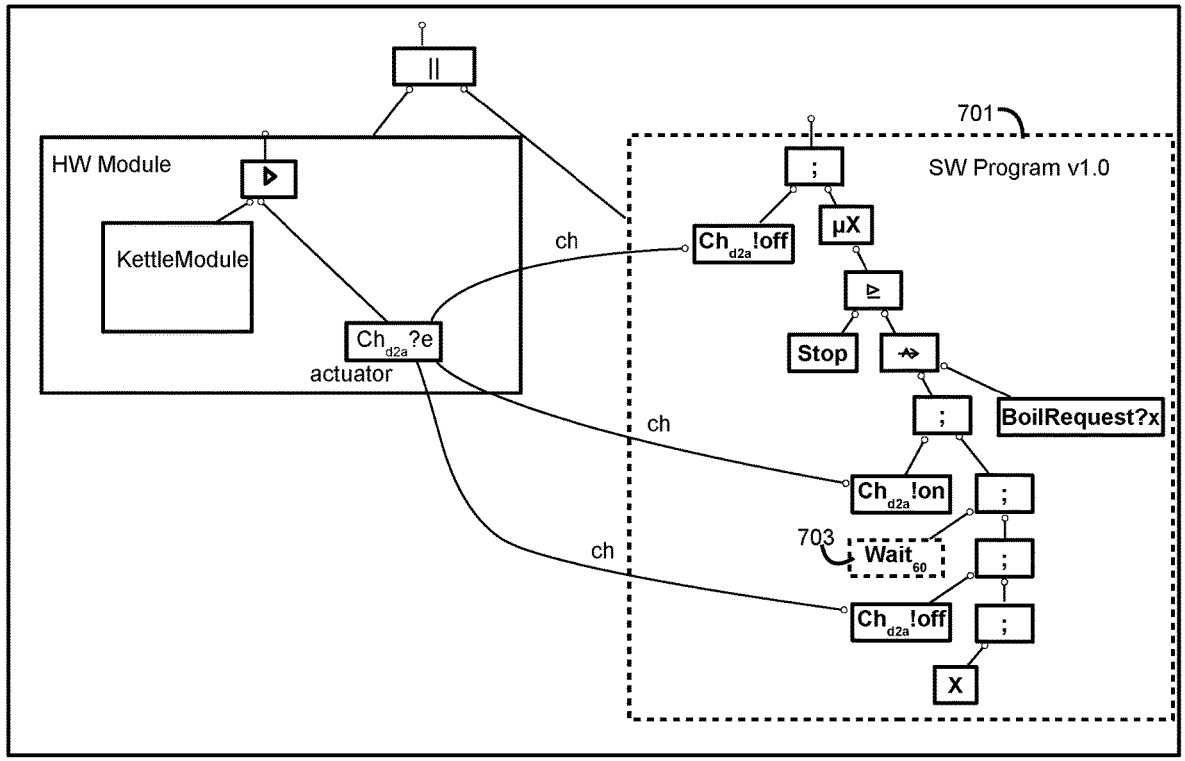
FIG. 7 is a graphical notation to identify a change, which combines elements of a high-level representation and a low-level executable representation.

FIG. 7 is a novel graphical notation to identify the change, which combines elements of a high-level representation like POE-Δ and a low-level executable representation such as HSCP and the like. The change localization diagram of FIG. 7 shows the first step. In order to enable the control logic to consider feedback from a temperature sensor in its decision whether to keep heating up or turn off the heating actuator, the module $Wait_{60}$ will be replaced as indicated by the SW Program Block 701 and $Wait_{60}$ block 703 borders being displayed as a broken line.

Figure 8:
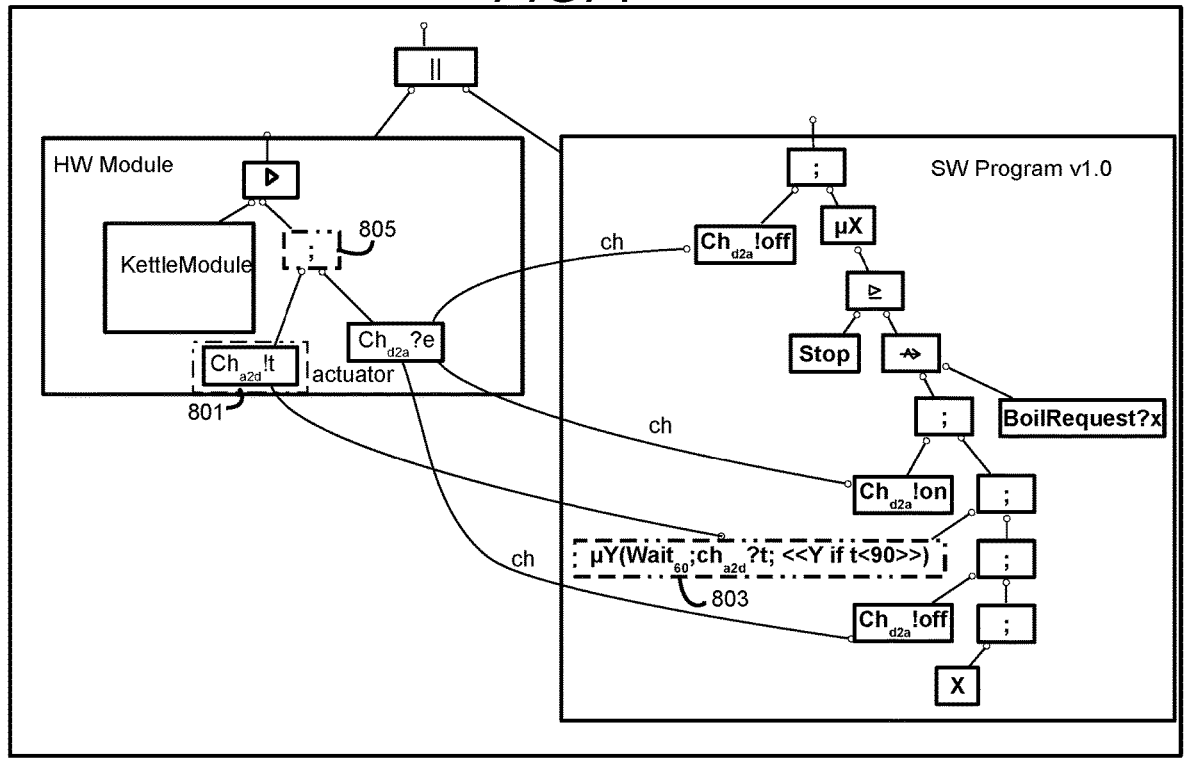
FIG. 8 is the graphical notation of FIG. 7 illustrating a change, which combines elements of a high-level representation and a low-level executable representation and includes a cascading system change.

FIG. 8 shows the updated change design to implement to safety measures identified in the original change design. In this case, the logic $Wait_{60}$ is being replaced by a security patch, that cause the system to wait for an output from temperature sensor 801, then compares the temperature reading to the 90° threshold. If the temperature exceeds the threshold an input value to trigger the element to turn off is provided to control the kettle heating element. The new logic is denoted $\mu Y(Wait1; cha2d?t; \ll Y \text{ if } t<90\gg)$ 803. The addition of the new logic causes a cascading change that leads to the incorporation of a new hardware sensor 805 in the kettle in order to allow the new control logic to read the current temperature of the kettle.

The new change design under consideration of the safety property can be again easily verified by using our semantic function to move from the high-level POE-Δ change calculus to the executable HCSP/Simulink notation. The result of this successful validation is shown in FIG. 9.

Figure 9:
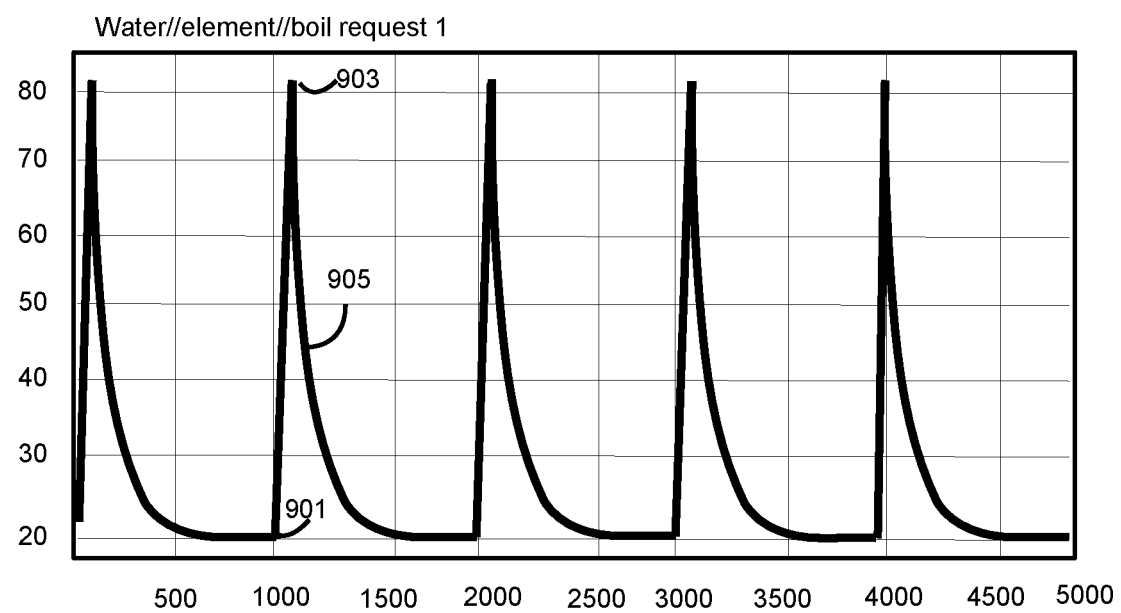
FIG. 9 is a graphical representation of a validation result according to aspects of embodiments of this disclosure.

FIG. 9 is a graphical depiction of the operation of the kettle system following that addition of safety measures as indicated in FIG. 8. As indicated in FIG. 9 each heating/cooling cycle is consistent and predictable. Each command to turn on the heating element 901 causes the temperature to increase. Due to the additional logic and feedback from the temperature sensor, a command to turn off the heating element 903 occurs when the temperature approaches 90°. Accordingly, the maximum temperature spikes never exceed 90° and prevent a dangerous overheating condition. The cool down period 905 occurs gradually and allows for the system to completely cool down before the next heating command is received.

Figure 10:
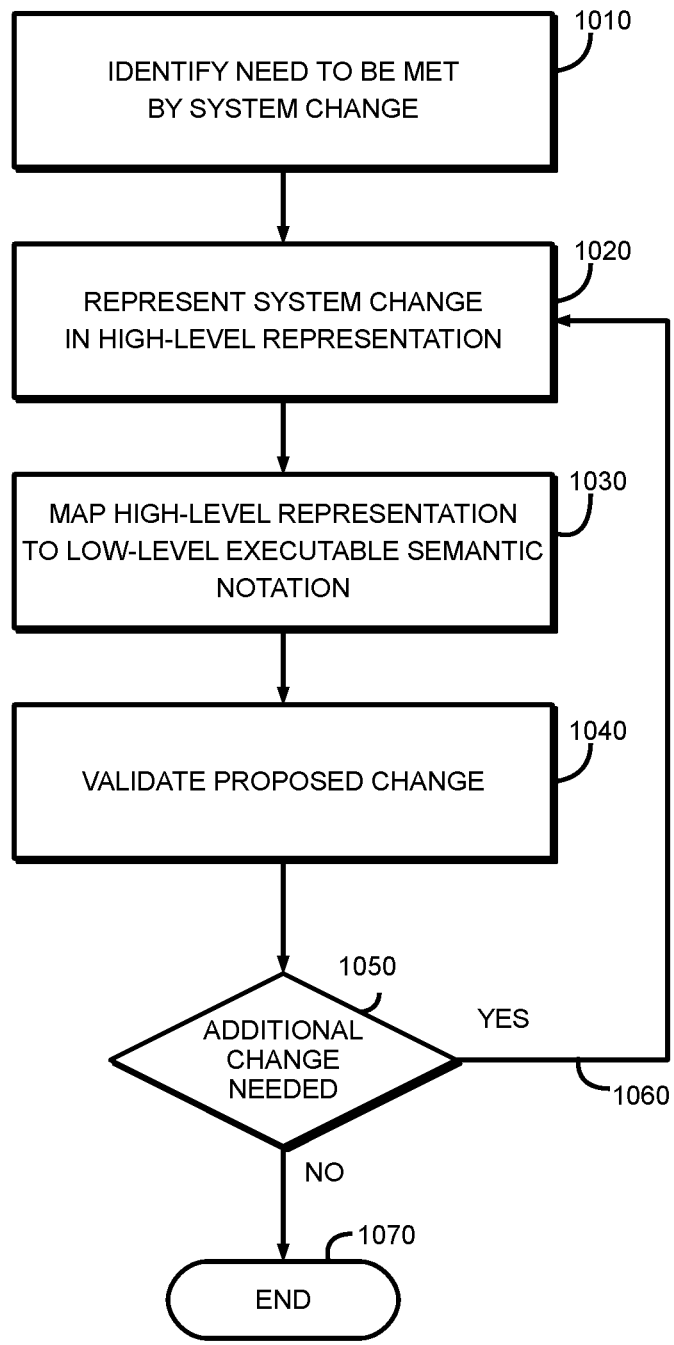
FIG. 10 is a process flow diagram of a change management process according to aspects of embodiments of this disclosure.

FIG. 10 is a process flow diagram for implementing change management in a system according to aspects of some embodiments of this disclosure. A need for change is identified by a need of a user that may be met by the system change 1010. The proposed change to the system is then represented in a high-level representation 1020. The high-level representation may be prepared according to a notation such as POE-Δ, alternatively other high-level representations or notations may be used. The high-level representation is then mapped to a low-level executable semantic notation 1030. One example of a low-level executable semantic notation is HSCP however other low-level notations may be used. Using the low-level executable semantic notation, a validation of the proposed change is performed 1040. Validation may be achieved through simulation. In simulation, flaws in the system design relating the proposed change may be discovered. Additional changes may be needed to address these flaws 1050. If validation indicates that additional changes are needed 1060, then the additional changes are implemented into an updated change and the new changes are represented in the high-level representation 1020 and steps 1030 through 1050 are repeated. Once the proposed change is validated without requiring additional changes, the process ends 1070.

Figure 11:
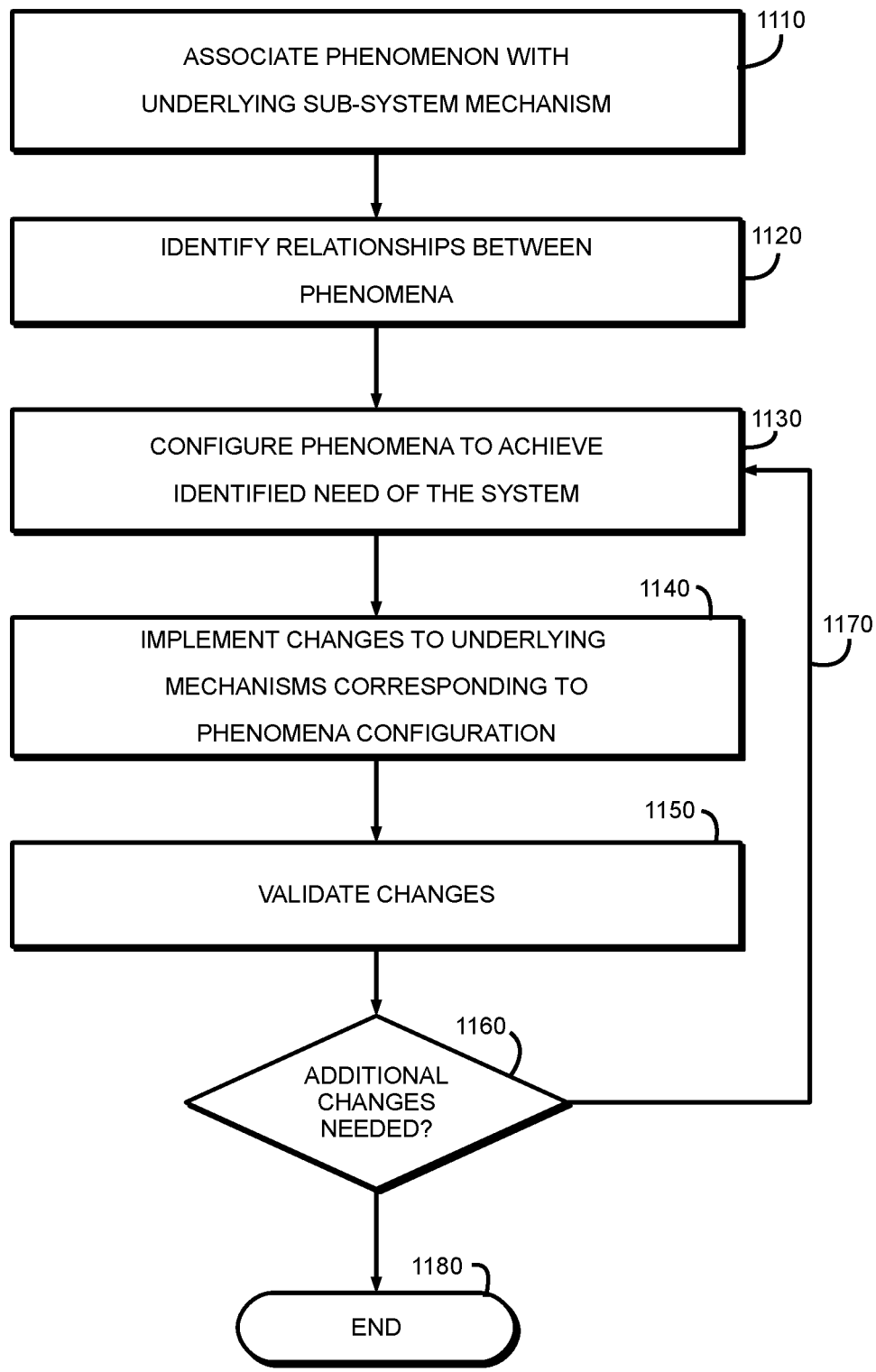
FIG. 11 is a process flow diagram for mapping a high-level representation to a low-level executable semantic model according to aspects of embodiments of this disclosure.

FIG. 11 is a process diagram for mapping a high-level representation of a system change to a low-level executable semantic model. In a first step, a phenomenon is associated with a mechanism comprising one or more components of a sub-system of the overall system 1110. Interactions occur between the phenomena which are identified 1120 and characterized as channels represented by phenomenon models. A need required of the system is identified and the phenomena are configured to satisfy the need 1130. Underlying mechanisms that produce the phenomena are implemented to produce the desired phenomena 1140. The updated changes to the mechanisms are validated 1150 to determine the proposed change's ability to meet the need without need additional changes identified through the validation. If additional changes are needed 1160, the phenomena are reconfigured to comply with the additional changes. If no additional changes are needed 1180 the change is complete.

Through the integration of a high-level change design calculus and a low-level formalism with executable semantics, a seamless transition between different abstraction levels is enabled in the context of the overall change process. The resulting approach provides a systematic way for representing and analyzing technical changes, pinpointing the exact intervention necessary in the system, but also showing its potential impact to the rest of the system as well as to the incorporating environment at a high level, while at the same time enabling the automatic validation of the high-level changes by means of a semantic mapping of high-level representations to an executable formalism. Using a Simulink implementation of these semantics is then applied to analyze and validate a change scenarios on the presented Kettle example—one where the change intervention involves the discovery of new requirements and the addition of an additional sensors as a result of the change ramifications to the rest of the system.

In case of a software design based on UML models which contain sufficient level of detail to be usable for code generation and are broad enough in scope to cover relevant aspects of the operating environment and not only of the change subject, a change analysis will show subsequent change impacts to other elements in the UML diagrams. This approach will also allow the generation of code, which can be executed to confirm or reject certain assumptions made during the change design. Such an approach, however, will not provide a systematic process to guide the change analysis nor the sub-sequent change design.

Figure 12:
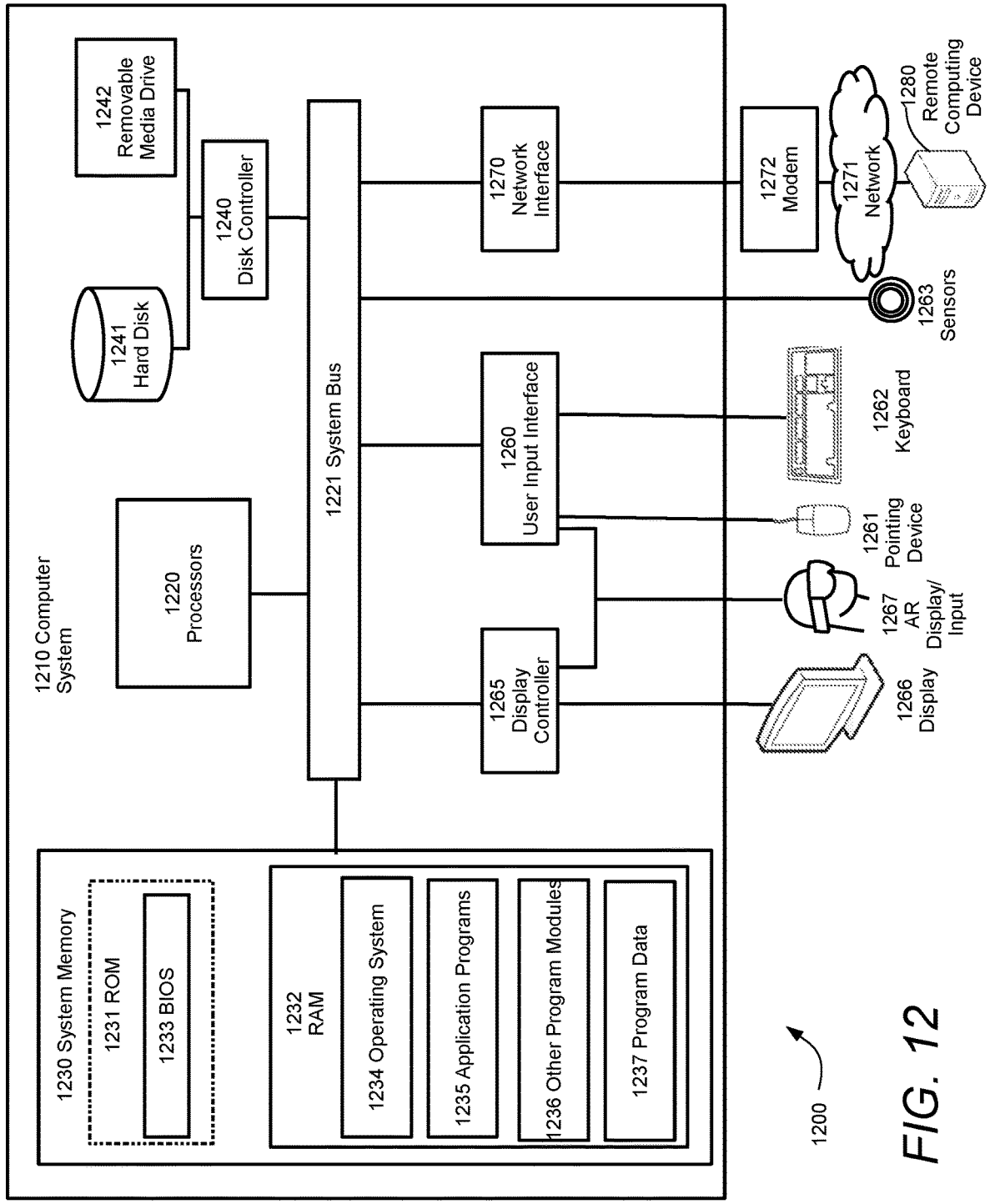
FIG. 12 is a block diagram of a computer system on which aspects of embodiments of this disclosure can be implemented.

FIG. 12 illustrates an exemplary computing environment 1200 within which embodiments of the invention may be implemented. Computers and computing environments, such as computer system 1210 and computing environment 1200, are known to those of skill in the art and thus are described briefly here.

As shown in FIG. 12, the computer system 1210 may include a communication mechanism such as a system bus 1221 or other communication mechanism for communicating information within the computer system 1210. The computer system 1210 further includes one or more processors 1220 coupled with the system bus 1221 for processing the information.

The processors 1220 may include one or more central processing units (CPUs), graphical processing units (GPUs), or any other processor known in the art. More generally, a processor as used herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general-purpose computer. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

Continuing with reference to FIG. 12, the computer system 1210 also includes a system memory 1230 coupled to the system bus 1221 for storing information and instructions to be executed by processors 1220. The system memory 1230 may include computer readable storage media in the form of volatile and/or nonvolatile memory, such as read only memory (ROM) 1231 and/or random-access memory (RAM) 1232. The RAM 1232 may include other dynamic storage device(s) (e.g., dynamic RAM, static RAM, and synchronous DRAM). The ROM 1231 may include other static storage device(s) (e.g., programmable ROM, erasable PROM, and electrically erasable PROM). In addition, the system memory 1230 may be used for storing temporary variables or other intermediate information during the execution of instructions by the processors 1220. A basic input/output system 1233 (BIOS) containing the basic routines that help to transfer information between elements within computer system 1210, such as during start-up, may be stored in the ROM 1231. RAM 1232 may contain data and/or program modules that are immediately accessible to and/or presently being operated on by the processors 1220.

System memory 1230 may additionally include, for example, operating system 1234, application programs 1235, other program modules 1236 and program data 1237.

The computer system 1210 also includes a disk controller 1240 coupled to the system bus 1221 to control one or more storage devices for storing information and instructions, such as a magnetic hard disk 1241 and a removable media drive 1242 (e.g., floppy disk drive, compact disc drive, tape drive, and/or solid state drive). Storage devices may be added to the computer system 1210 using an appropriate device interface (e.g., a small computer system interface (SCSI), integrated device electronics (IDE), Universal Serial Bus (USB), or FireWire).

The computer system 1210 may also include a display controller 1265 coupled to the system bus 1221 to control a display or monitor 1266, such as a cathode ray tube (CRT) or liquid crystal display (LCD), for displaying information to a computer user. The computer system includes an input interface 1260 and one or more input devices, such as a keyboard 1262 and a pointing device 1261, for interacting with a computer user and providing information to the processors 1220. Inputs may also be received via the system bus 1221 from one or more sensors 1263. Sensors 1263 are devices that sense a given condition in the environment of the system and provide a signal that is representative of the state pertaining the condition. Sensors may provide information to a change management system for measuring phenomena which interact to coordinate changes throughout an overall system according to embodiments of the present invention. The pointing device 1261, for example, may be a mouse, a light pen, a trackball, or a pointing stick for communicating direction information and command selections to the processors 1220 and for controlling cursor movement on the display 1266. The display 1266 may provide a touch screen interface which allows input to supplement or replace the communication of direction information and command selections by the pointing device 1261. In some embodiments, an augmented reality device 1267 that is wearable by a user, may provide input/output functionality allowing a user to interact with both a physical and virtual world. The augmented reality device 1267 is in communication with the display controller 1265 and the user input interface 1260 allowing a user to interact with virtual items generated in the augmented reality device 1267 by the display controller 1265. The user may also provide gestures that are detected by the augmented reality device 1267 and transmitted to the user input interface 1260 as input signals.

The computer system 1210 may perform a portion or all the processing steps of embodiments of the invention in response to the processors 1220 executing one or more sequences of one or more instructions contained in a memory, such as the system memory 1230. Such instructions may be read into the system memory 1230 from another computer readable medium, such as a magnetic hard disk 1241 or a removable media drive 1242. The magnetic hard disk 1241 may contain one or more datastores and data files used by embodiments of the present invention. Datastore contents and data files may be encrypted to improve security. The processors 1220 may also be employed in a multi-processing arrangement to execute the one or more sequences of instructions contained in system memory 1230. In alternative embodiments, hard-wired circuitry may be used in place of or in combination with software instructions. Thus, embodiments are not limited to any specific combination of hardware circuitry and software.

As stated above, the computer system 1210 may include at least one computer readable medium or memory for holding instructions programmed according to embodiments of the invention and for containing data structures, tables, records, or other data described herein. The term "computer readable medium" as used herein refers to any medium that participates in providing instructions to the processors 1220 for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks, such as magnetic hard disk 1241 or removable media drive 1242. Non-limiting examples of volatile media include dynamic memory, such as system memory 1230. Non-limiting examples of transmission media include coaxial cables, copper wire, and fiber optics, including the wires that make up the system bus 1221. Transmission media may also take the form of acoustic or light waves, such as those generated during radio wave and infrared data communications.

The computing environment 1200 may further include the computer system 1210 operating in a networked environment using logical connections to one or more remote computers, such as remote computing device 1280. Remote computing device 1280 may be a personal computer (laptop or desktop), a mobile device, a server, a router, a network PC, a peer device or other common network node, and typically includes many or all of the elements described above relative to computer system 1210. When used in a networking environment, computer system 1210 may include modem 1272 for establishing communications over a network 1271, such as the Internet. Modem 1272 may be connected to system bus 1221 via user network interface 1270, or via another appropriate mechanism.

Network 1271 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 1210 and other computers (e.g., remote computing device 1280). The network 1271 may be wired, wireless or a combination thereof. Wired connections may be implemented using Ethernet, Universal Serial Bus (USB), RJ-6, or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 1271.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine-readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof.

What is claimed is:

1. A computer implemented method of generating a systematic change solution in a system comprising:
   identifying an unsatisfied need to be met by the system;
   representing a proposed change to the system to satisfy the need in a high-level representation of the proposed change;
   evaluating relationships between the proposed change and at least one additional sub-system of the system to identify dependencies between the proposed change and the at least one sub-system;
   updating the proposed change in the high-level representation to address an identified dependency;
   mapping the high-level representation to a low-level executable semantic implementation model of the system;
   identifying a new component required by the system based on the mapping;
   running a simulation on the low level executable semantic implementation model of the system including the newly identified component;
   iteratively updating the implementation model based on the simulation and validating each updated implementation model through simulation until no further changes are deemed necessary; and
   implementing the updated implementation model as changes to the system to improve the system to satisfy the need;
   wherein the low-level executable semantic model is consistent with a hybrid communicating sequential processes (HCSP);
   cascading an additional change based on the proposed chance to the system; and
   wherein the proposed change is a change to a logic program and the additional change is the addition of a hardware sensor to provide an input to the logic program.

2. The method of claim 1, further comprising:
   on a condition that the validating steps determines that additional changes are required:
      representing the additional changes in the high-level representation of the system;
      mapping the additional changes to the low-level executable semantic model; and
      re-validating the additional changes.

3. The method of claim 2, wherein the additional changes related to a security aspect of the system.

4. The method of claim 2, wherein the additional change relates to a safety aspect of the system.

5. The method of claim 1, wherein mapping the high-level representation to the low-level executable semantic model comprises:
   identifying at least one phenomenon associated with an underlying mechanism of sub-system of the overall system;
   identifying relationships between phenomena;
   configuring a plurality of phenomena to achieve the identified need of the system; and
   implement changes to the underlying mechanism to achieve the configuration of the plurality of phenomena.

6. A system for managing change in a complex system comprising:
   a hardware module that enables a physical functionality of the complex system;
   a software program performing logical operations to control functions of the complex system;
   a computer processor configured to manage change in the complex system; and
   software instructions that when executed by the computer processor cause the computer processor to perform the steps of:
      identifying an unsatisfied need to be met by the system;
      representing a proposed change to the system to satisfy the need in a high-level representation of the proposed change;
      evaluating relationships between the proposed change and at least one additional sub-system of the system to identify dependencies between the proposed change and the at least one sub-system;
      updating the proposed change in the high-level representation to address an identified dependency;
      mapping the high-level representation to a low-level executable semantic implementation model of the system;
      identifying a new component required by the system based on the mapping;
      running a simulation on the low level executable semantic implementation model of the system including the newly identified component;
      iteratively updating the implementation model based on the simulation and validating each updated implementation model through simulation until no further changes are deemed necessary; and
      implementing the validated change in one or both of the hardware module and the software program to improve the system by satisfying the need;
   wherein the software instructions comprise instructions that cause the computer processor to further perform the step of:

cascading an additional change based on the proposed change to the system;

wherein the low-level executable semantic model is consistent with a hybrid communication serial problems (HCSP);

wherein the software instructions comprise instructions that cause the computer processor to further perform the step of: cascading an additional change based on the proposed change to the system; and wherein the proposed change is a change to a logic program and the additional change is the addition of a hardware sensor to provide an input to the logic program.

7. The system of claim 6, wherein the software instructions further comprise instructions that when executed by the computer process cause the computer processor on a condition that the validating step determines that additional changes are required to:

represent the additional changes in the high-level representation of the system;

map the additional changes to the low-level executable semantic model; and re-validate the additional changes.

8. The system of claim 7, wherein the additional changes related to a security aspect of the system.

9. The system of claim 7, wherein the additional change relates to a safety aspect of the system.

10. The system of claim 6, wherein mapping the high-level representation to the low-level executable semantic model comprises:

identifying at least one phenomenon associated with an underlying mechanism of sub-system of the overall system;

identifying relationships between phenomena;

configuring a plurality of phenomena to achieve the identified need of the system; and implement changes to the underlying mechanism to achieve the configuration of the plurality of phenomena.

* * * * *